United States Patent
Yeh et al.

(10) Patent No.: US 9,671,582 B2
(45) Date of Patent: Jun. 6, 2017

(54) PLUGGABLE OPTICAL TRANSCEIVER MODULE

(71) Applicant: Applied Optoelectronics, Inc., New Taipei (TW)

(72) Inventors: Che-Shou Yeh, New Taipei (TW); Chao-Hung Tsai, New Taipei (TW); Chien-Te Lin, New Taipei (TW)

(73) Assignee: Applied Optoelectronics, Inc., New Taipei (TW)

( * ) Notice: Subject to any disclaimer, the term of this patent is extended or adjusted under 35 U.S.C. 154(b) by 499 days.

(21) Appl. No.: 14/263,142

(22) Filed: Apr. 28, 2014

(65) Prior Publication Data
US 2015/0188635 A1   Jul. 2, 2015

(30) Foreign Application Priority Data
Dec. 31, 2013   (TW) .............................. 102149251 A (51) Int. Cl.
*G02B 6/42*   (2006.01)
*H04B 10/40*   (2013.01)

(52) U.S. Cl.
CPC ......... *G02B 6/4261* (2013.01); *G02B 6/4284* (2013.01); *H04B 10/40* (2013.01)

(58) Field of Classification Search
CPC .. G02B 6/4261; G02B 6/4284; G02B 6/3807; G02B 6/387; G02B 6/389
See application file for complete search history.

(56) References Cited

U.S. PATENT DOCUMENTS

| | | | | |
|---|---|---|---|---|
| 6,570,768 | B2* | 5/2003 | Medina | G02B 6/4246 361/728 |
| 6,762,940 | B2* | 7/2004 | Zaremba | G02B 6/4292 361/728 |
| 7,033,191 | B1* | 4/2006 | Cao | G02B 6/3847 439/157 |
| 7,114,984 | B2* | 10/2006 | Shirk | H01R 13/62933 439/157 |
| 7,215,554 | B2* | 5/2007 | Torres | G02B 6/4292 361/728 |
| 7,955,003 | B2* | 6/2011 | Teo | H01R 13/6275 385/88 |
| 8,597,045 | B2* | 12/2013 | Zhu | H01R 13/506 439/357 |

(Continued)

*Primary Examiner* — Daniel Petkovsek
(74) *Attorney, Agent, or Firm* — Grossman Tucker Perreault & Pfleger, PLLC; Norman S. Kinsella (57) ABSTRACT

A pluggable optical transceiver module for being plugged in a housing is provided. The housing has a cover and an elastic piece, and the cover has an accommodating space. One end of the elastic piece is connected to the cover while the other end has a first fastening portion. The first fastening portion is located on one side of the accommodating space. The pluggable optical transceiver module comprises a base and a sliding member. The base comprises a base body and a second fastening portion. The base body has a guide surface, and the second fastening portion is next to the guide surface. The base is for being plugged in the accommodating space, and the second fastening portion is fastened with the first fastening portion. The sliding member comprises a body section and a push section connected to each other. The body section is slidably disposed on the base.

15 Claims, 6 Drawing Sheets

(56) References Cited

U.S. PATENT DOCUMENTS

| | | | |
|---|---|---|---|
| 8,790,022 B2* | 7/2014 | Yi | G02B 6/4284 |
| | | | 385/89 |
| 9,316,797 B2* | 4/2016 | Ista | G02B 6/3893 |
| 2003/0142917 A1* | 7/2003 | Merrick | G02B 6/4201 |
| | | | 385/53 |
| 2011/0267742 A1* | 11/2011 | Togami | G02B 6/4246 |
| | | | 361/679.01 |

* cited by examiner

PLUGGABLE OPTICAL TRANSCEIVER MODULE

CROSS-REFERENCE TO RELATED APPLICATIONS

This non-provisional application claims priority under 35 U.S.C. §119(a) on Patent Application No(s). 102149251 filed in Taiwan, R.O.C. on Dec. 31, 2013, the entire contents of which are hereby incorporated by reference.

TECHNICAL FIELD

The disclosure relates to an optical communication component, more particularly to a pluggable optical transceiver module.

BACKGROUND

An optical transceiver module is usually used in today's high-speed communication network and the optical transceiver module is often installed in electronic communication equipment. For better flexibility and maintenance, it is plugged in the slot of the communication equipment in a pluggable way. Generally, the slot is disposed on the circuit board. For defining the electrical interface and mechanical interface between the optical transceiver module and the corresponding slot, a variety of standards are introduced. For instance, a SFP+ standard for 10 GB/s communication speed (10 Gigabit Small Form Factor Plug gable).

A lock mechanism is disposed in the slot corresponding to the optical transceiver module for locking the optical transceiver module into the final position when plugging it in. In addition, the optical transceiver module needs to have a departing mechanism for separating itself from the slot. Hence, it is important to improve the plugging process regarding the optical transceiver module and the slot.

SUMMARY

A pluggable optical transceiver module for being plugged in a housing is provided. The housing has a cover and an elastic piece, and the cover has an accommodating space. One end of the elastic piece is connected to the cover while the other end has a first fastening portion. The first fastening portion is located on one side of the accommodating space. The pluggable optical transceiver module comprises a base and a sliding member. The base comprises a base body and a second fastening portion. The base body has a guide surface, and the second fastening portion is next to the guide surface. The base is for being plugged in the accommodating space, and the second fastening portion is fastened with the first fastening portion. The sliding member comprises a body section and a push section connected to each other. The body section is slidably disposed on the base for making the sliding member have a fastening position and a release position. When the sliding member is located at the fastening position, the push section is separated from the elastic piece. When the sliding member is at the release position, the push section is guided to push the elastic piece by the guide surface for making the second fastening portion be separated from the first fastening portion.

BRIEF DESCRIPTION OF THE DRAWINGS

The present disclosure will become more fully understood from the detailed description and the drawings given herein below for illustration only, and thus does not limit the present disclosure, wherein:

FIG. 5A to FIG. 6B are schematic views of the movement of the pluggable optical transceiver module and the housing.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
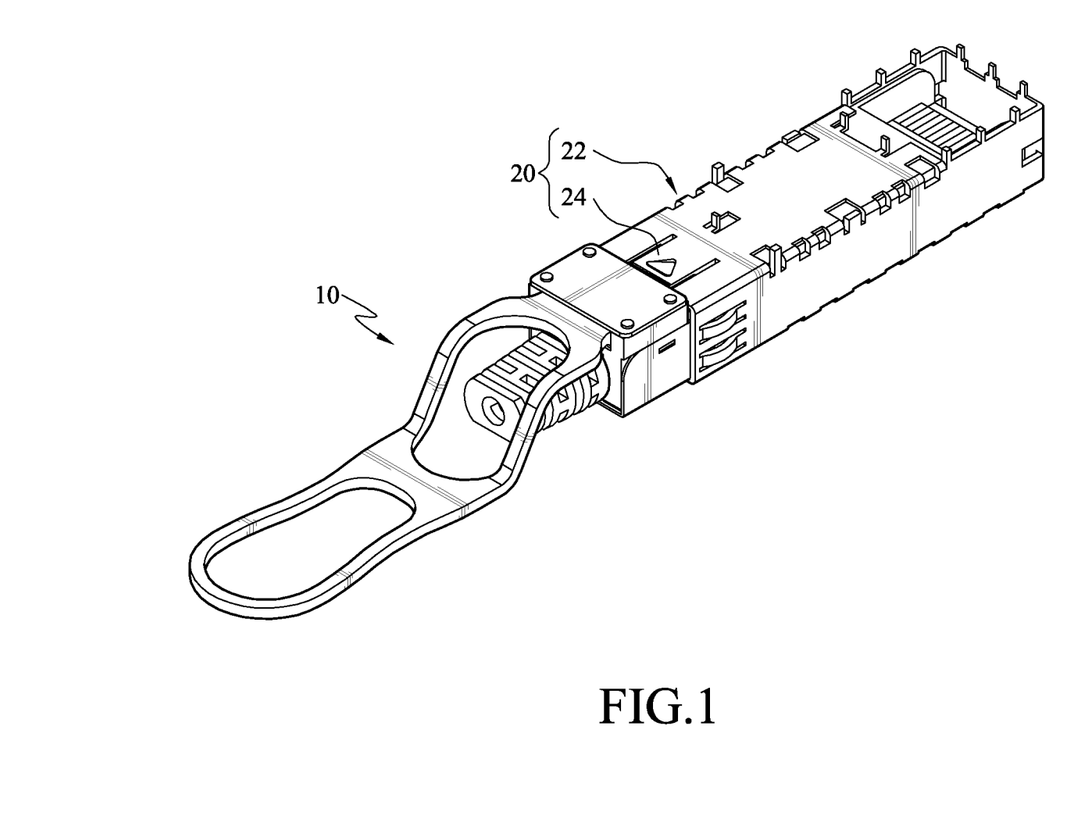
FIG. 1 is a perspective view of a pluggable optical transceiver module plugged in the housing according to the first embodiment of the disclosure.
Figure 2:
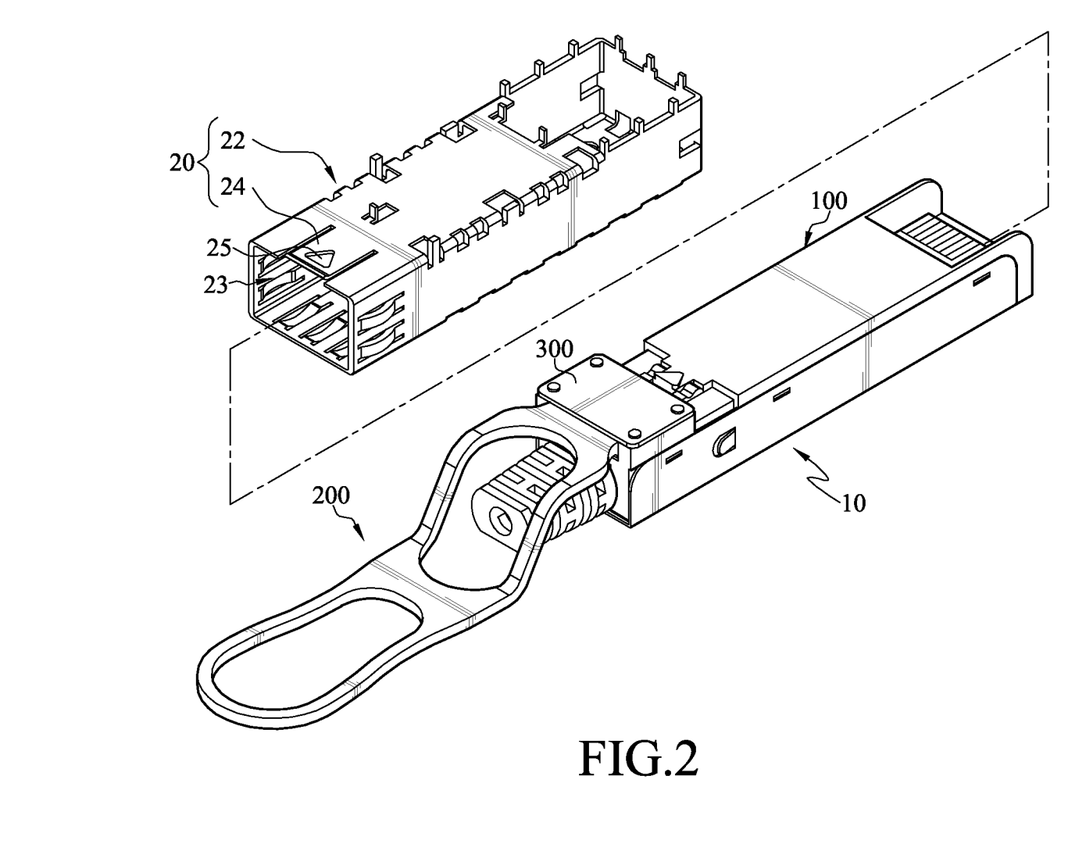
FIG. 2 is an exploded view of FIG. 1.
Figure 3:
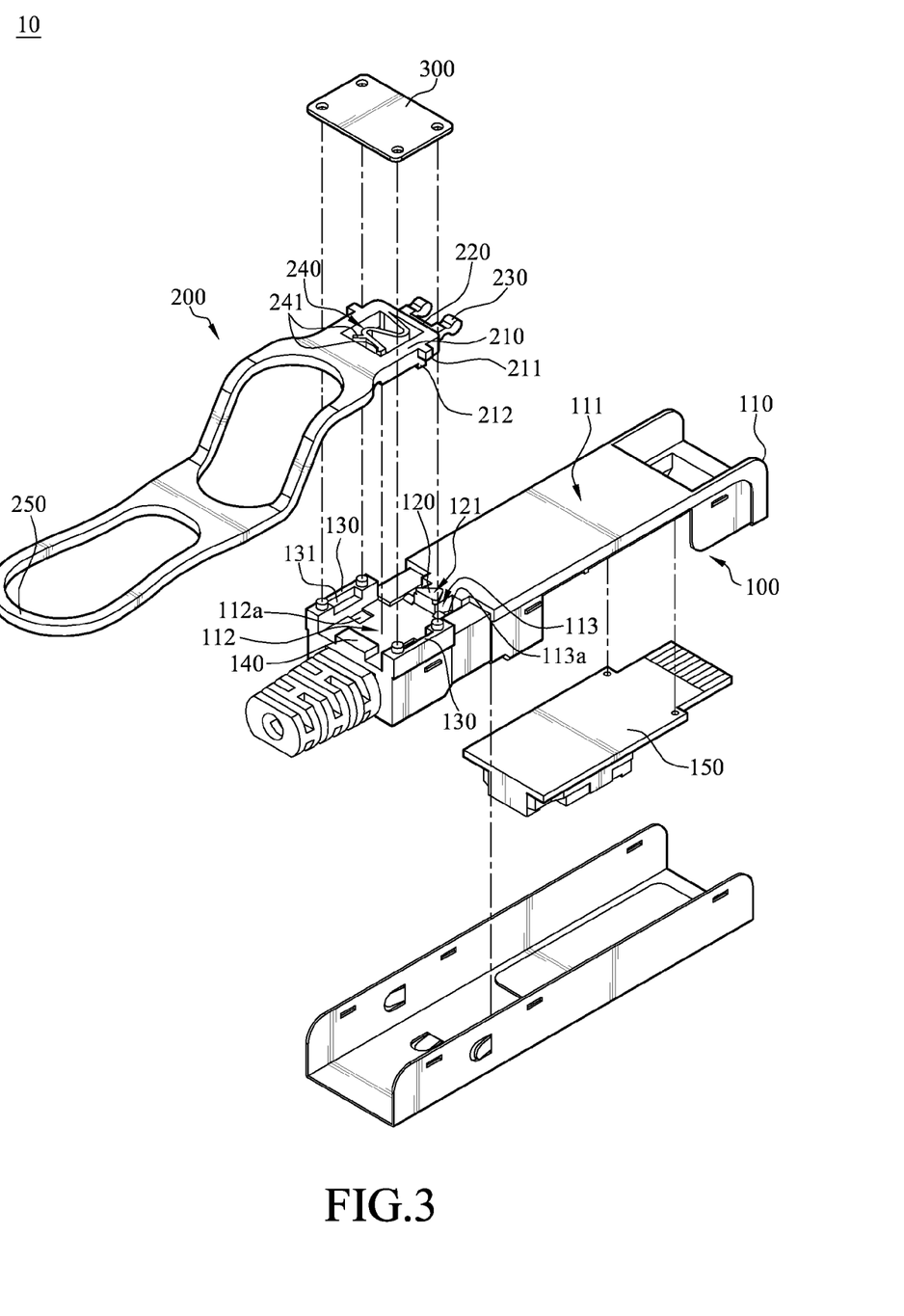
FIG. 3 is an exploded view of the pluggable optical transceiver module of FIG. 1.
Figure 4:
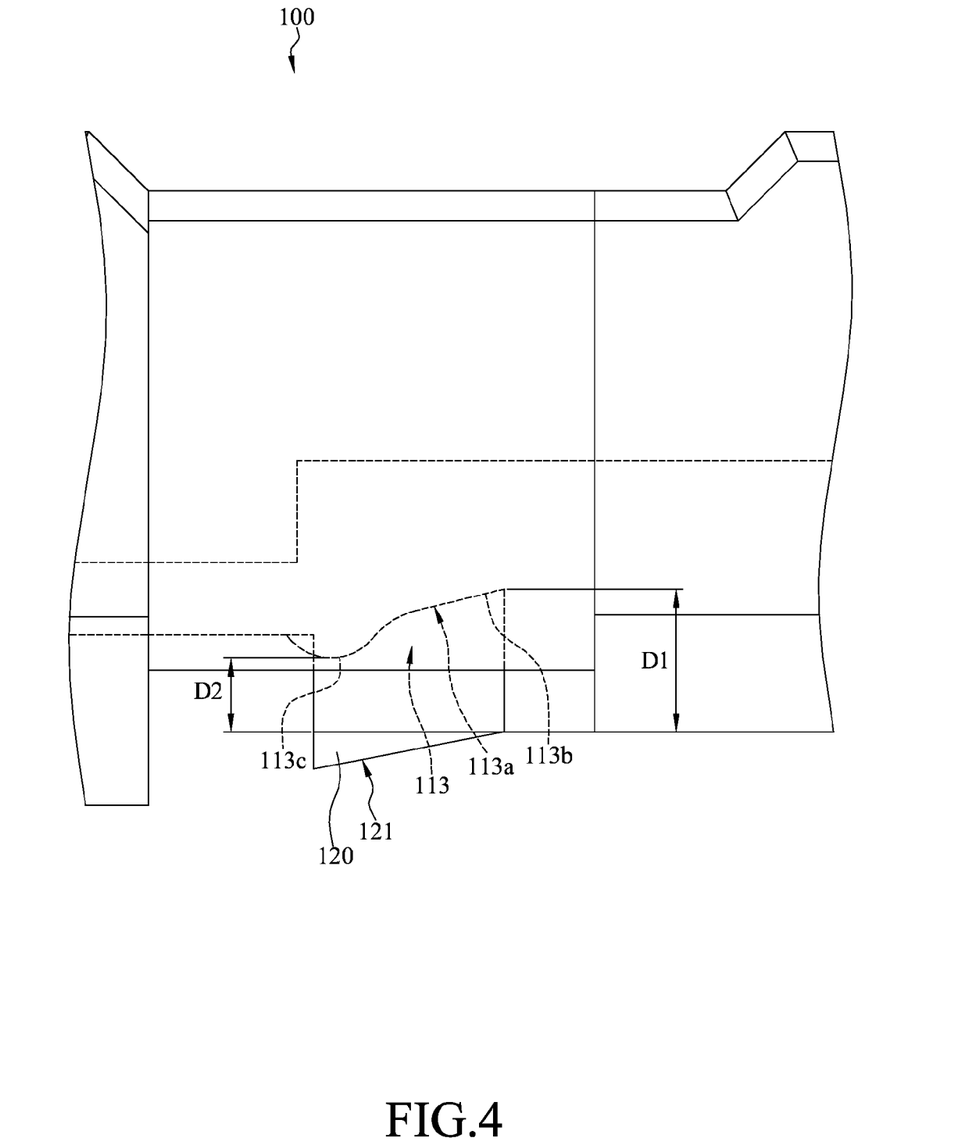
FIG. 4 is an enlarged side view of the base of FIG. 3.
Figure 5A:
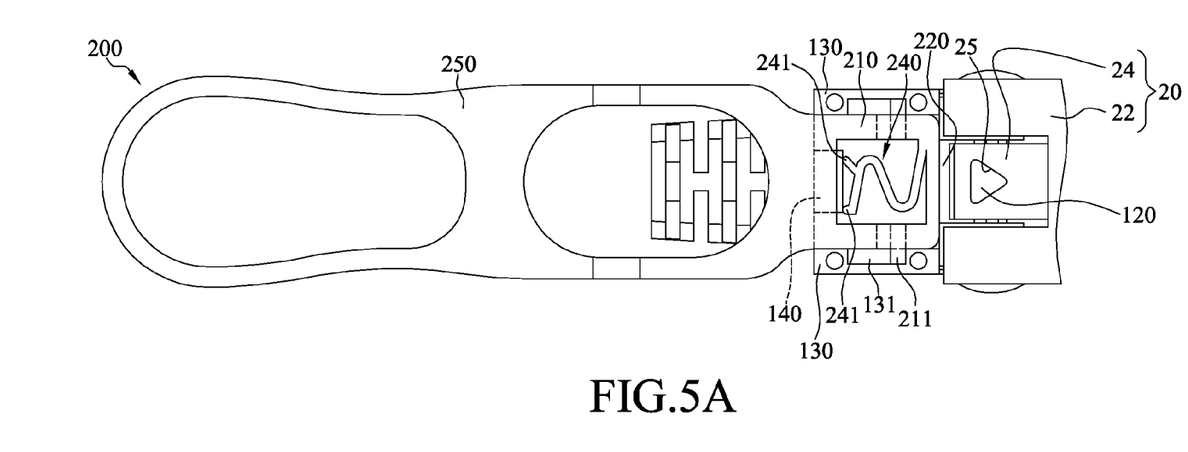
Figure 5B:
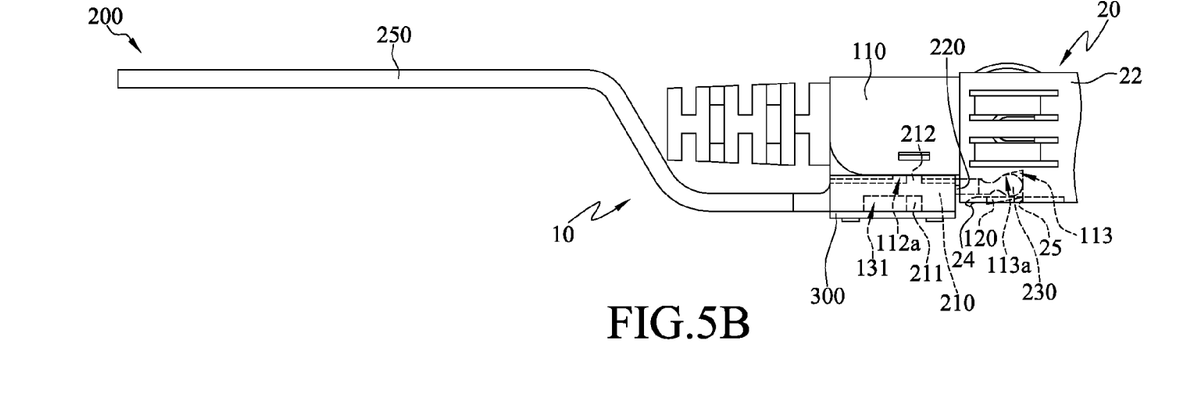

FIG. 1 is a perspective view of a pluggable optical transceiver module plugged in the housing according to the first embodiment of the disclosure; FIG. 2 is an exploded view of FIG. 1; FIG. 3 is an exploded view of the pluggable optical transceiver module of FIG. 1. FIG. 4 is an enlarged side view of the base of FIG. 3. As seen in FIG. 1 to FIG. 4, the pluggable optical transceiver module 10 of this embodiment is for being plugged in a housing 20. The housing 20 has a cover 22 and an elastic piece 24. The cover 22 has an accommodating space 23. One end of the elastic piece 24 is connected to the cover 22 while the other end has a fastening portion 25. The fastening portion 25 is, for example, a triangle hole. The fastening portion 25 is located on one side of the accommodating space 23.

The pluggable optical transceiver module 10 comprises a base 100, a sliding member 200 and a cover plate 300. The base 100 is for being plugged in the accommodating space 23 of the cover 22. The base 100 comprises a base body 110, a second fastening portion 120, two side walls 130, a pressed block 140 and a circuit 150. The base body 110 has a bottom surface 111, a concave portion 112 and two guide grooves 113. The concave portion 112 is formed inwardly from the bottom surface 111 and has two limit grooves 112a. The second fastening portion 120 is, for example, a triangle stick corresponding to the fastening portion 25 for being fastened with the fastening portion 25. The second fastening portion 120 is located on one side of the concave portion 112 and protrudes from the bottom surface 111. One side of the second fastening portion 120 away from the base body 110 has a top surface 121. However, the above-mentioned shapes of the fastening portion 25 and the second fastening portion 120 are not intended to limit the disclosure. That is, the shapes of the fastening portion 25 and the second fastening portion 120 interchange. The two guide grooves 113 are located on one side of the concave portion 112 and the second fastening portion 120 is between the two guide grooves 113. The two guide grooves 113 each have a guide surface 113a having a fastening end 113b and a release end 113c. The vertical distance D1 from the fastening end 113b of the guide surface 113a to the top surface 121 is greater than the vertical distance D2 from the release end 113c of the guide surface 113a to the top surface 121 (as shown in FIG. 4).

The two side walls 130 are located on the concave portion 112 and each have a sliding groove 131.

The pressed block 140 is located on the concave portion 112 while the two limit grooves 112a and the pressed block 140 are all located between the two side walls 130.

The circuit 150 is located in the base body 110. When the pluggable optical transceiver module 10 is plugged in the housing 20, the circuit 150 is for being electrically connected to the connector inside the housing 20.

The sliding member 200 comprises a body section 210, a flexure section 220, two abutting sections 230, a reset portion 240 and a pull portion 250 all connected together. The body section 210 is located on the concave portion 112 and is slidably disposed on the base body 110 for making the sliding member 200 has a fastening position and a release position. Specifically, opposite two sides of the body section 210 each have a sliding block 211 located in the two sliding groove 131 of the two side walls 130 in a slidable manner. The body section 210 has two limit blocks 212 located in the two limit grooves 112a in a slidable way.

The flexure section 220 is between the body section 210 and the abutting sections 230. The abutting sections 230 is configured for moving relative to the body section 210 depending on the elastic deformation capacity of the flexure section 220.

The two abutting sections 230 are respectively inside the two guide grooves 113. The abutting sections 230 is, for example, a protruding block whose width is in a range between the vertical distance from the fastening end 113b to the top surface 121 and the vertical distance from the release end 113c to the top surface 121. When the sliding member 200 is at the fastening position, the abutting sections 230 is at the fastening end 113b of the guide surface 113a and it is not in touch with the elastic piece 24. By comparison, when the sliding member 200 is at the release position, the abutting sections 230 is guided by the guide surface 113a to slide to the release end 113c of the guide surface 113a and abuts on the elastic piece 24 for separating the fastening portion 25 from the second fastening portion 120.

In this embodiment, the numbers of the guide grooves 113 and the abutting sections 230 do not limit the disclosure. That is, in other embodiments, the number of the guide grooves 113 and that of the abutting sections 230 may respectively be one.

One end of the reset portion 240 is connected to the body section 210 while the other end abuts on the pressed block 140 of the base body 110. The reset portion 240 has elastic resetting force which making the sliding member 200 be at the fastening position in normal circumstances.

In this embodiment, one side of the reset portion 240 away from the body section 210 comprises two abutting blocks 241. The two abutting blocks 241 abut on the pressed block 140 together. The reset portion 240 abut on the pressed block 140 in the two-point contact via the two abutting blocks 241 for more consistent resetting results, but it is not limited thereto. In other embodiments, the reset portion 240 may abut on the pressed block 140 in a one-point contact without the abutting blocks 241.

The body section 210 is located between the flexure section 220 and the pull portion 250. The pull portion 250 is for users to pull the sliding member 200 to move relative to the base 100.

In this embodiment, the material of the sliding member 200 is plastic and the type of the plastic is Nylon 66. Additionally, the body section 210, the flexure section 220, the abutting sections 230, the reset portion 240 and the pull portion 250 are integrally formed for better structural strength.

The cover plate 300 is installed on the base body 110 of the base 100 and making the sliding member 200 be disposed between the base body 110 and the cover plate 300.

FIG. 5A to FIG. 6B are schematic views of the movement of the pluggable optical transceiver module and the housing. As seen in FIG. 5A to FIG. 6B, the pluggable optical transceiver module 10 is fastened with the housing 20 and the sliding member 200 is at the fastening position because of the elastic resetting force of the reset portion 240. When the sliding member 200 is at the fastening position, the abutting sections 230 is located on the fastening end 113b of the guide surface 113a and is not in touch with the elastic piece 24.

Figure 6A:
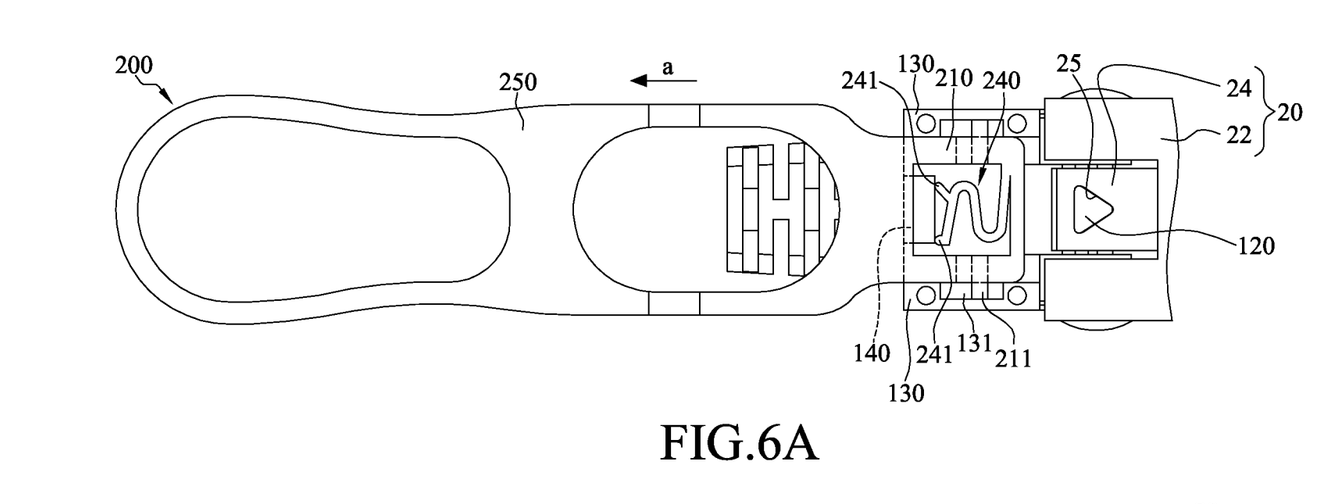
Figure 6B:
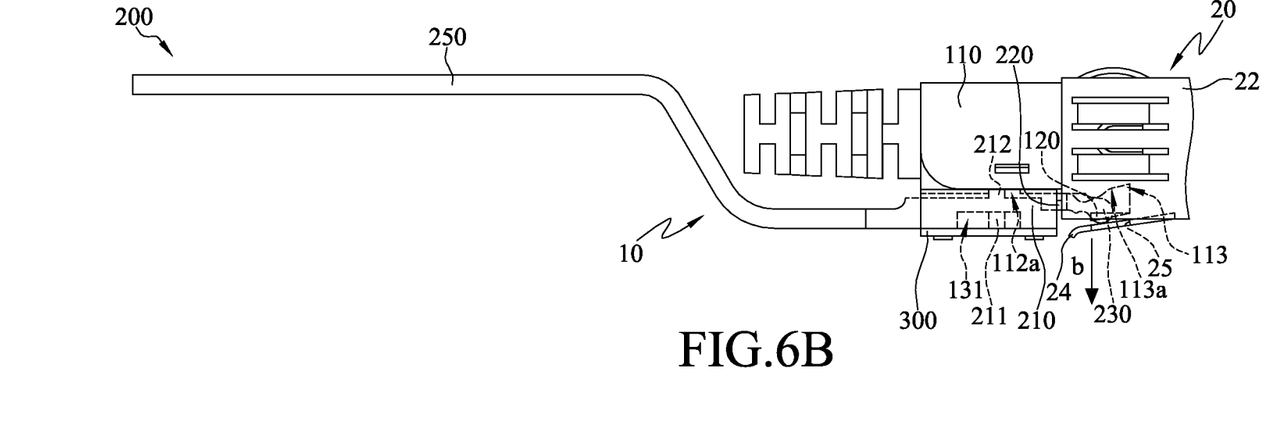

As shown in FIG. 6A to FIG. 6B, when the pluggable optical transceiver module 10 is dropped out from the housing 20, the user may pull the sliding member 200 to slide it to the release position relative to the base 100 (along the direction of arrow a). The abutting sections 230 is guided by the guide surface 113a to slide to the release end 113c of the guide surface 113a for abutting on the elastic piece 24. Thereby, the elastic piece 24 deforms towards the direction away form the base 100 (namely along the direction of arrow b) for separating the fastening portion 25 from the second fastening portion 120. As a result, the user may take the pluggable optical transceiver module 10 out from the housing 20 quickly, which improves the convenience of plugging and removing processes.

In the pluggable optical transceiver module of the disclosure, when it is needed to be dropped out from the housing, the user may pull the sliding member to slide relative to the base. In addition, the abutting section of the sliding member is guided by the guide surface to abut on the elastic piece for separating the first fastening portion from the second fastening portion quickly. Hence, the convenience of the plugging and removing processes is significantly improved.

What is claimed is:

1. A pluggable optical transceiver module for being received within a housing, the housing having a cover and an elastic piece, the cover having an accommodating space, one end of the elastic piece being connected to the cover and the other end having a first fastening portion, the first fastening portion being located on one side of the accommodating space, and the pluggable optical transceiver module comprising:

a base comprising a base body and a second fastening portion, the base body having a guide surface, the base being configured to be received within the accommodating space; and a sliding member comprising a body section, a reset portion, and an abutting section, the body section being slidably disposed on the base such that the sliding member has a fastening position and a release position, the reset portion being positioned within an opening extending through the body section such that the reset portion urges the sliding member towards the fastening position when in the release position, wherein, when the sliding member is located at the fastening position, the abutting section is separated from the elastic piece such that the first fastening portion engages the second fastening portion; and when the sliding member is at the release position, the abutting section engages the elastic piece, causing the second fastening portion to separate from the first fastening portion.

2. The pluggable optical transceiver module according to claim 1, further comprising a cover plate installed in the base body of the base, wherein the sliding member is between the base body and the cover plate.

3. The pluggable optical transceiver module according to claim 1, wherein the base further comprises a pressed block, the pressed block is located on the base, wherein one end of the reset portion is connected to the body section while the other end abuts on the pressed block of the base for making the sliding member be at the fastening position normally.

4. The pluggable optical transceiver module according to claim 3, wherein one side of the reset portion away from the body section comprises two abutting blocks both abutting on the pressed block.

5. The pluggable optical transceiver module according to claim 4, wherein the reset portion and the body section are integrally formed.

6. The pluggable optical transceiver module according to claim 5, wherein the material of the sliding member is plastic, and the type of the plastic is Nylon 66.

7. The pluggable optical transceiver module according to claim 3, wherein the sliding member further comprises a pull section, the sliding member further comprises a flexure section located between the body section and the abutting section, and the base section is between the flexure section and the pull section.

8. The pluggable optical transceiver module according to claim 1, wherein the base body has a bottom surface and a concave portion formed inwardly from the bottom surface, the base further comprises two side walls located on the concave portion, the two side walls respectively have a sliding groove, opposing sides of the body section each have a sliding block respectively and the two sliding blocks are located in the two sliding groove in a slidable manner.

9. The pluggable optical transceiver module according to claim 1, wherein the concave portion has at least one limit groove, the body section has a limit block, and the limit block is located in the limit groove in a slidable manner.

10. The pluggable optical transceiver module according to claim 1, wherein the second fastening portion has a top surface, the guide surface has a fastening end and a release end, the vertical distance from the fastening end to the top surface is greater than the vertical distance from the release end to the top surface, when the sliding member is located at the release position, the abutting section is located on the release end of the guide surface and abuts on the elastic piece for separating the second fastening portion from the first fastening portion.

11. The pluggable optical transceiver module according to claim 10, wherein the abutting section is a protruding block, the width of the protruding block ranges from the vertical distance from the fastening end to the top surface to the vertical distance from the release end to the top surface.

12. The pluggable optical transceiver module according to claim 1, wherein the sliding member further comprises a flexure section located between the body section and the abutting section, and the abutting section is configured for moving relative to the body section depending on the elastic deformation capacity of the flexure section.

13. The pluggable optical transceiver module according to claim 1, wherein the base body has at least one guide groove, and the at least one guide groove is located on one side of the second fastening portion.

14. The pluggable optical transceiver module according to claim 13, wherein the number of the guide grooves is two, the second fastening portion is between the two guide grooves, the number of the abutting sections is two, the abutting sections are protruding blocks, when the sliding member is located at the fastening position, the two abutting sections are inside the two guide grooves, and when the sliding member is at the release position, the two abutting sections are guided by the two guide surfaces to together abut on the elastic piece, for separating the second fastening portion from the first fastening portion.

15. The pluggable optical transceiver module according to claim 13, wherein the base further comprises a circuit inside the base body.

* * * * *